Nov. 18, 1924.
J. H. BEST
1,515,824
DISPLAY TRUCK
Filed Jan. 25, 1922
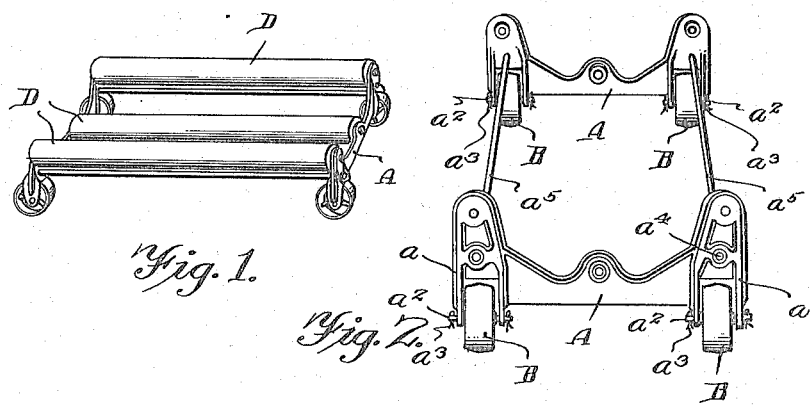
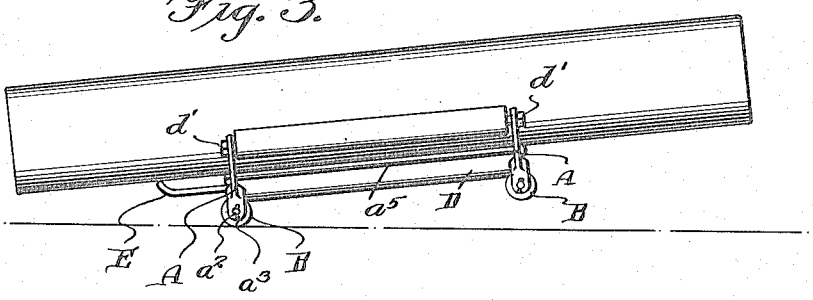
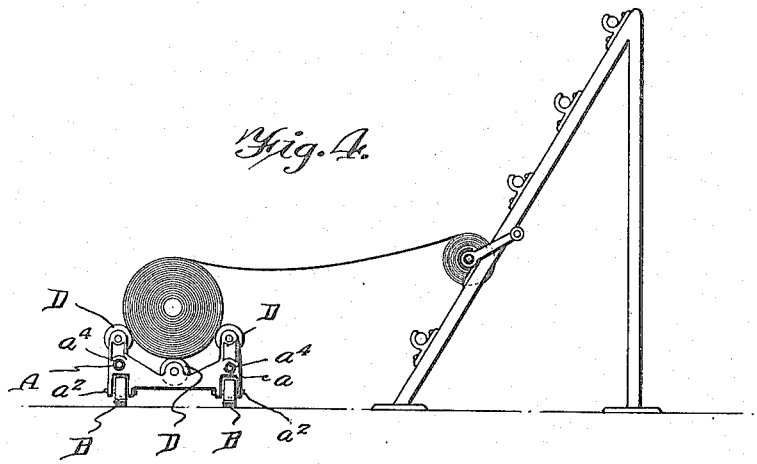

Patented Nov. 18, 1924.

1,515,824

UNITED STATES PATENT OFFICE.

JOHN H. BEST, OF GALVA, ILLINOIS.

DISPLAY TRUCK.

Application filed January 25, 1922. Serial No. 531,737.

*To all whom it may concern:*

Be it known that JOHN H. BEST, a citizen of the United States, residing at Galva, in the county of Henry and State of Illinois, has invented certain new and useful Improvements in Display Trucks, of which the following is a specification.

This invention relates to trucks, especially cradle trucks that are used in stores, warehouses, docks and other places where hand trucks are used for moving or handling merchandise, such as linoleum, floor coverings and other articles, either in transferring articles from place to place or in removing a part of a roll from a truck to enable a dealer to cut off a desired portion of a roll for a customer or to transfer the entire contents of a roll to a rack adapted to hold a series of rolls of different patterns so that a portion of each pattern may be drawn down to be viewed by a customer.

The objects of the invention are to provide a cradle truck which will be light in weight, simple in construction, cheap of manufacture and which can be readily moved about from place to place either by moving the truck on its wheels or carried by the operator, as a popular size that I have in use weighs only about twenty pounds and is about twelve inches wide by twenty inches long. Notwithstanding its reduced size and weight, it is well adapted and very convenient to use, in large as well as small concerns.

The invention consists of a truck having a cradle shaped bed consisting of a plurality of revolving rollers mounted upon plates which constitute the ends of the truck. These rollers may be made of any suitable material, although I prefer to make them with metal axles covered with wood which I varnish in order to make the surface very smooth and hard and thereby offer but little resistance to the merchandise when the same is to be unwound to expose a portion of the same or to transfer it to a rack of any desired capacity.

The supporting wheels of the truck are mounted in downwardly extended legs. These wheels rotate in line with the longitudinal axis of the truck only. They are not swiveled to the frame. At first swiveled casters were used, but they were found to be impractical and were discarded. By making the bearings of the wheels solid with the frame of the truck instead of forming a swivelling connection between the wheels and the truck, the truck will not be drawn to one side laterally or shift its base, when the opertaor undertakes to draw, e. g. linoleum sidewise from a roll that is resting on the rollers either for exhibition purposes or to transfer the entire roll to a rack.

The truck is provided with a handle and bracket at one end, or at both ends if desired, with which the truck can be manually picked up and carried to some other point. The truck is so light that it can be conveniently carried from place to place instead of providing means for pushing or rolling it. This bracket and handle preferably extend upwardly and outwardly for several inches, but I usually have the highest portion of it a little below a straight line drawn from the top line of the middle roller of the plurality of rollers upon which the roll of linoleum or roll of some other article rests, for a purpose which I will now explain.

It will be understood that linoleum comes in rolls that are six or nine feet or more in width. When a roll of this material is placed in the cradle of the truck, the end of the linoleum will extend far beyond the ends of the truck, which may be only twenty inches long. In moving this load from one point to another it may be necessary to turn some angle. In order to do this with great care and the least effort, one end of the linoleum may be slightly raised, the opposite end forming a pivot, whereby the roll bears down upon the upper side of the bracket and handle and thereby lifts the opposite end of the truck from the floor so that the entire load rests upon the opposite wheels of the truck. In this position the operator can readily change the direction of the truck. I facilitate this change by beveling the supporting rolls from their centers.

The truck, weighing only twenty pounds, I have repeatedly carried a load of linoleum weighing from eight hundred to one thousand pounds, then picked up the truck, as one would a satchel, and carried it back to the place from which I came, or to some other point, whereas a truck of the usual construction could not be carried.

Only one of my trucks is necessary to enable an operator to manipulate a roll from six to nine feet wide, but when the roll is twelve feet wide, I use two of my cradle trucks.

Referring to the drawings:

Fig. 1 is a perspective view of a cradle truck embodying my invention, with the bracket and handle removed.

Fig. 2 is a perspective view of the same with the rollers removed.

Fig. 3 shows a side elevation of the truck having a roll of linoleum thereon, the bracket having been tilted to show two of the supporting rollers raised from the floor.

Fig. 4 is a view of a rack and cradle truck and a roll of linoleum being transferred from the truck to the rack.

In the drawings, like letters of reference represent like parts.

A are the end plates of the truck which are provided with legs $a$, $a$ at each corner thereof to receive the axle $a^2$, which axle $a^2$, with its supporting wheels B, is secured in the legs $a$ of the plates A, said axle being secured by any suitable means, as by cotter pins $a^3$. The rollers D are made of any suitable material, but preferably of wood, and are mounted upon the end plates A by any suitable means, as by screws or bolts $d'$. One of the end plates is provided with a bracket or handle E which extends outwardly several inches from the truck and is preferably inclined upward to a point that is below a right line drawn from the top surface of the lowest roller of the cradle. By depressing one end of the linoleum upon the bracket or handle of the truck the weight of the truck and its load is thrown upon two of the supporting wheels of the truck, whereby you can change the direction of travel. This position of the bracket or handle will prevent it from rubbing the linoleum in removing it from the roll or transferring it to a rack. The change of the direction of travel of the truck is facilitated by beveling the supporting wheels in opposite directions from their centers.

Assuming that a dealer wishes to display a particular pattern of linoleum by unrolling a portion thereof upon the floor, he can readily do so by simply pulling out the desired portion, either to display it or to unroll a sufficient quantity to supply a given order, but if it is desired to transfer the entire roll of linoleum to a rack such as shown in Fig. 4, the truck is rolled in front of the rack, when the end of the linoleum is unwound and fastened to a shaft on the rack and is then wound off by turning a crank on the shaft to which said linoleum has been attached. The end plates A are readily held in position by rods $a^4$ which pass through tubes $a^5$. I have shown three rotating rollers mounted in the frame of the truck, but I do not confine myself to the use of any particular number of said rollers. It will be noted that the supporting rollers B travel in a line with the longitudinal axis of the truck and therefore resist any shifting of the truck when the linoleum or other article is withdrawn in whole or in part from the truck either for the purpose of exhibiting it or transferring it to a rack.

It will be noted that in Fig. 1, the roller base is much shorter than the length of the bed of the truck. For use in connection with merchandise, as linoleum and other floor coverings, I have found that a truck about twelve inches wide and twenty inches long, which size trucks I have manufactured and which have given satisfaction in practical use, only weighs about twenty pounds, which enables the operator to pick it up and carry it about from place to place. This truck is very simple in construction, light in weight, cheap of manufacture and is adapted for use in large or small concerns where merchandise of the kinds referred to is handled. In transferring linoleum from six to nine feet wide, to a rack, it is only necessary to use one truck, but where the linoleum is twelve feet wide, then it is convenient to use two of the trucks.

It will be understood that I do not confine myself to the exact details of construction herein shown as an embodiment of my invention, but reserve the right to make such changes as fall within the terms of my invention, as shown in the drawing and described in the claims.

I claim:

1. A cradle truck comprising a frame having centrally depressed end plates, bracing rods connecting said end plates, supporting wheels mounted in the lower and outer ends of said end plates to rotate in fixed planes, load carrying rollers mounted in said end plates, a central load carrying roller mounted in said end plates and lower than said first named rollers, all of said rollers forming a centrally depressed load carrying bed and being adapted to rotate in planes substantially at right angles to the planes of rotation of said supporting wheels, the ends of said load carrying bed being freely open, whereby the load may project beyond each end of said bed and a truck tilting bracket associated with said frame projecting beyond one end thereof and lower than said central roller, and adapted to be depressed by said load to raise the opposite end of said cradle truck.

2. In a cradle truck, a frame comprising centrally depressed end plates connected by bracing rods, load carrying rollers mounted in said end plates, a central load carrying roller mounted in said end plates and lower than said first named rollers, all of said rollers extending the entire length of the truck and forming a centrally depressed load carrying bed, supporting wheels mounted in the lower and outer ends of said end plates and arranged beneath the ends of the load carrying rollers, said supporting wheels being adapted to rotate in fixed planes substantially at right angles to the planes of rotation of the load carrying rollers, the ends of the load carrying bed being freely open, whereby the load may project beyond each end of said bed, and an upwardly extending truck tilting bracket, rigidly associated with said frame projecting beyond one end thereof and lower than said central roller, and adapted to raise the opposite end of said cradle truck, said bracket being normally out of contact with the load whereby the load will not be rubbed when being transferred from the truck.

In testimony whereof he affixes his signature.

JOHN H. BEST.